US006485785B1

(12) United States Patent
Mino et al.

(10) Patent No.: US 6,485,785 B1
(45) Date of Patent: Nov. 26, 2002

(54) COATING FILM, AND METHOD AND APPARATUS FOR PRODUCING THE SAME

(75) Inventors: Norihisa Mino, Nara (JP); Mitsuo Ebisawa, Kyoto (JP); Yoshiaki Oono, Mie (JP); Kazufumi Ogawa, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 6 days.

(21) Appl. No.: 09/636,225

(22) Filed: Aug. 10, 2000

(30) Foreign Application Priority Data

Aug. 31, 1999 (JP) .............................. 11-244322

(51) Int. Cl.[7] .............................. B05D 3/02; B05D 3/04; B05D 3/10; B05D 3/12; B05D 1/28
(52) U.S. Cl. ..................... 427/352; 427/355; 427/377; 427/429
(58) Field of Search ................. 427/355, 352, 427/377, 429, 165

(56) References Cited

U.S. PATENT DOCUMENTS

| 3,667,420 A | | 6/1972 | Mechling |
| 4,761,316 A | | 8/1988 | Ogawa |
| 5,234,718 A | * | 8/1993 | Mino et al. .................. 427/352 |
| 5,635,246 A | * | 6/1997 | Ogawa et al. ............... 427/341 |
| 5,948,476 A | | 9/1999 | Otake et al. |
| 6,277,444 B1 | * | 8/2001 | Ohtake et al. ............... 427/333 |

FOREIGN PATENT DOCUMENTS

| EP | 0 484 886 | 5/1992 |
| EP | 492 545 | 7/1992 |
| EP | 0 841 099 | 5/1998 |
| EP | 841099 A1 | * 5/1998 |
| EP | 0 848 005 | 6/1998 |
| JP | 10-180179 | 7/1988 |
| JP | 64-70917 | 3/1989 |
| JP | 6-310413 | 11/1994 |

OTHER PUBLICATIONS

Research Report of Tokyo Metropolitan Industrial Center; "Preparation and characterization of glass coating films by the sol–gel method", No. 22; pp. 57–60 (1993).
Partial European Search Report, no date provided.

* cited by examiner

Primary Examiner—Michael Barr
(74) Attorney, Agent, or Firm—Merchant & Gould P.C.

(57) ABSTRACT

A compound represented by a general formula (1) $ABX_n$ (where A is a carbon-containing group; B is at least one element selected from Si, Ge, Sn, Ti and Zr; X is a hydrolyzable group; and n is 1, 2 or 3), for example, a chlorosilane compound having a fluorocarbon group, is measured in an amount required for one time application, and dropped from a nozzle on a surface of a substrate having an active hydrogen on the surface, and simultaneously it is rubbed with a coater made of a sponge or a nonwoven fabric, etc. Furthermore, it is rubbed with a coater made of a sponge or a nonwoven fabric, etc. while blowing a dry warm air, and an elimination reaction is caused between the active hydrogen on the surface of the substrate and the hydrolyzable group of the compound. Thus, the compound is covalently bonded to the substrate. The molecules of the silane compound also are polymerized with one another to be fixed. Thus can be provided a coating film and a method and an apparatus for producing the same, in which: an amount of a liquid required for forming a film is decreased even when the substrate has an irregular shape and a large size; it is not necessary to be concerned for the pot life of a coating solution; the substrate is manipulated easily; and cost is low.

14 Claims, 16 Drawing Sheets

COATING FILM, AND METHOD AND APPARATUS FOR PRODUCING THE SAME

FIELD OF THE INVENTION

The present invention relates to a coating film (hereinafter also referred to as "an organic thin film"), and a method and an apparatus for producing the same, in which a compound having a hydrolyzable group, e.g. a silane-based compound, is chemically bonded to a surface of a substrate.

BACKGROUND OF THE INVENTION

Traditionally, methods of forming organic thin films have been developed. Typical examples of conventional technologies for forming organic thin films are bar coating, dipping, etc. According to these methods, a film having a thickness on the order of at least tens of micrometer is formed. Furthermore, these methods control the thickness of the film on the order of about micrometer, and are not suitable for controlling the film thickness on the order of nanometer. Spin coating is an example of a more controllable method than these methods, and is often used to form devices having a minute structure such as semiconductors. According to this method, formation of a film having a thickness of about one to several micrometers can be realized, and also the thickness of the film can be controlled easily. However, because the organic thin film produced by this method is not bonded integrally to a substrate, the film may peel off easily. In the manufacture of semiconductor devices, such an ease of peeling is required, and this method is utilized.

On the other hand, it already has been proposed to form a molecular film by applying a chlorosilane-based compound, which has a chlorosilyl group at an end of a molecule containing an alkyl group or a fluoroalkyl group, to a surface of glass or the like having an active hydrogen on the surface, and covalently bonding it to the surface by a hydrogen chloride elimination reaction.

As conventional technologies, there are methods in which a substrate is immersed in a coating solution containing a chlorosilane-based compound (JP 1-70917A, EP 0492545A). In another example, a method in which a chlorosilane-based compound as a gas is brought into contact with a surface of a substrate and reacted has been proposed. Also, when using an alkoxysilane-based compound, a method in which an aqueous solution thereof is prepared and hydrolyzed to form a coating film has been proposed (Research Report of Tokyo Metropolitan Industrial Center, No. 22, pages 57–60 (1993)). Furthermore, a more specific example is a method in which a molecular film is formed by roll coating (JP 10-180179 A).

The conventional immersion method is excellent when the shape of the object to be coated is not flat but is irregular. In this case, a film can be formed on the irregular surface, as a liquid reacts along the surface. However, in the immersion method, a large amount of liquid is required for immersion, and manipulations for removing and inserting a substrate are necessary. Thus, the operation becomes complex and requires a large amount of time, resulting in a high cost. Furthermore, because a chlorosilane-based compound reacts with water easily, its short pot life is a problem. Moreover, in the immersion method, because the chlorosilane-based compound is brought into contact with the entire substrate and reacted, the method is inconvenient when the substrate has a surface which is not desirable to be coated with the chlorosilane-based compound.

Furthermore, in the method in which a chlorosilane-based compound as a gas is brought into contact with a surface of a substrate and reacted, it is difficult to form a uniform molecular film. The same problem also occurs when using an alkoxysilane-based compound or an isocyanate silane-based compound. Furthermore, when using an aqueous solution of an alkoxysilane-based compound, film thickness is increased, and irregularity in film thickness is generated easily. The same applies to the case when using an isocyanate silane-based compound.

More specifically, the method in which a film is formed by roll coating has solved conventional problems in the immersion method, such as amount of liquid, complex operation, long operational time, dealing with a surface not needed to be coated, etc. However, it has a problem in that the object to be coated must be a flat plate. Moreover, there has not been any method in which an organic thin film having a thickness on the order of not more than submicrometer is produced at a low cost.

DISCLOSURE OF THE INVENTION

In order to solve the above-mentioned conventional problems, it is an object of the present invention to provide a coating film and a method and an apparatus for producing the same, in which an amount of a liquid required for forming a film is decreased even when an object (substrate) to be coated with the film is not a flat plate but has an irregular shape and a large size; it is not necessary to be concerned over the pot life of a coating solution; the substrate is manipulated easily; and cost is low.

In order to accomplish the above-mentioned object, the present invention provides a first method for producing a coating film using a compound (1) represented by a general formula (1) ABXn (where A is a carbon-containing group; B is at least one element selected from Si, Ge, Sn, Ti and Zr; X is a hydrolyzable group; and n is 1, 2 or 3) as a raw material, comprising: measuring the compound (1) in an amount required for one time application (a required amount) on a surface of a substrate having an active hydrogen on the surface, and supplying it to the surface of the substrate at each time of application; in an atmosphere having a water vapor concentration of more than 0.0076 $kg/m^3$, bringing the compound (1) into contact with the surface of the substrate, causing an elimination reaction between the active hydrogen on the surface of the substrate and the hydrolyzable group in parts of the molecules of the compound (1), thereby covalently bonding the parts of the molecules of the compound (1) to the surface of the substrate, as well as polymerizing parts of the molecules of the compound (1) with one another using water molecules present in the atmosphere.

Next, the present invention provides a second method for producing a coating film, comprising: applying a coating solution containing a silane-based compound having at least one reactive group selected from at least halogen atoms, an alkoxyl group and an isocyanate group to a surface of a substrate having an active hydrogen on the surface; causing an elimination reaction between the active hydrogen on the surface of the substrate and the reactive group of the silane-based compound, thereby covalently bonding the silane-based compound to the surface of the substrate, wherein the method comprises: conveying the substrate into a chamber in which a water vapor concentration in an atmosphere is maintained at more than 0.0076 $kg/m^3$; measuring a coating solution containing the silane-based compound and at least one solvent not having an active hydrogen in an amount required for one time application (a required amount), and supplying it to a coating device present in the chamber at each time of application; spreading and rubbing the coating solution uniformly on the surface of the substrate with the coating device; then changing the atmosphere in the chamber and increasing a concentration of the silane-based compound, thereby accelerating an elimination reaction between the reactive group in parts of the molecules of the silane-based compound and the active hydrogen on the surface of the substrate, thereby covalently bonding the silane-based compound to the surface of the substrate; then removing the solvent, as well as polymerizing parts of the molecules of the silane-based compound with one another using water molecules present in the atmosphere.

Next, an apparatus for producing a coating film of the present invention comprises: a device for transporting a substrate from an inlet to an outlet in a chamber; a device for measuring a coating solution containing a silane-based compound and at least one solvent not having an active hydrogen in an amount required for one time application (a required amount) and supplying it to a coating device present in the chamber at each time of application; a coating device for applying and spreading the coating solution uniformly, and for accelerating an elimination reaction between the reactive group of the silane-based compound in an amount required for one time application and the active hydrogen on the surface of the substrate; a device for controlling and maintaining a water vapor concentration in an atmosphere in the chamber; and a device for removing the solvent in the coating solution.

Next, a coating film of the present invention is characterized in that: the film is transparent; the film has a thickness of 1 nm to 0.5 $\mu$m; the film has a durability of at least five times for an abrasion resistance test in which a mixture of sugar and soy source (1:1 by weight ratio) is applied, heated at a high temperature of 300° C. for 20 minutes, and cooled, then a fouling baked and adhered to the film can be removed by rubbing with a wet cloth by one's hand; parts of the molecules of the film are covalently bonded to a surface of a substrate via at least one element selected from Si, Ge, Sn, Ti and Zr; and parts of the molecules of the film are polymerized with one another.

DETAILED DESCRIPTION OF THE INVENTION

Figure 1:
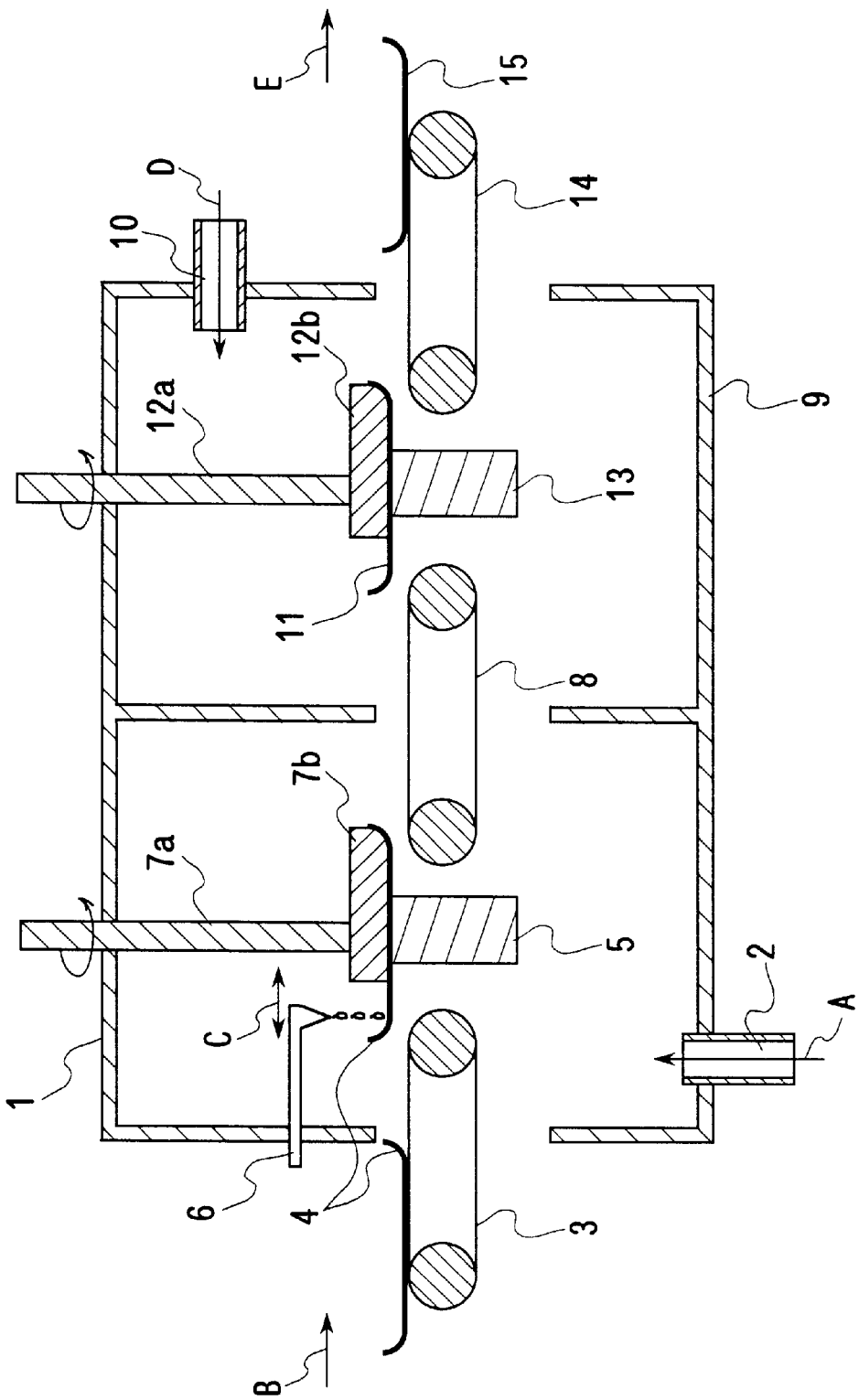
FIG. 1 is a schematic diagram of a rotational coating film-forming apparatus according to Example 4 of the present invention.

In the present invention, when using a chlorosilane compound as the silane-based compound, a hydrogen chloride elimination reaction occurs as the elimination reaction. When using an alkoxysilane compound, an alcohol elimination reaction occurs as the elimination reaction. And when using an isocyanate compound, an isocyanic acid elimination reaction occurs as the elimination reaction.

Furthermore, in the above-mentioned method, it is preferable that the silane-based compound contains an alkyl group or a fluoroalkyl group. Particularly, when containing a fluoroalkyl group, it has improved water repellency, oil repellency, and anti-fouling property, etc., and thus it is preferable.

Furthermore, in the above-mentioned method, it is preferable that the coating device is operated so that a liquid containing the silane-based compound is further brought into contact with the surface of the substrate in the step of increasing the concentration of the silane-based compound and accelerating an elimination reaction between the reactive group of the silane-based compound at least in an amount required for one time application and the active hydrogen on the surface of the substrate. Accordingly, the elimination reaction can be ensured better, and a final organic thin film of a high density can be formed.

Furthermore, in the above-mentioned method, it is preferable that the solvent is removed either by changing the atmosphere in the chamber or by operating the coating device, or by both. Accordingly, the concentration of the coating solution can be increased, so that probability of occurrence of the elimination reaction may be increased further.

Furthermore, in the above-mentioned method, it is preferable that the atmosphere in the chamber is changed by changing the temperature in the chamber, changing the gas flow rate in the chamber, or changing the temperature of the substrate, or by a combination of these measures.

Furthermore, in the above-mentioned method, it is preferable that the solvent not having an active hydrogen is at least one selected from hydrocarbon compounds, siloxane based compounds, and halogenated hydrocarbons. If the solvent has an active hydrogen, it will react with the silane-based compound.

Furthermore, in the above-mentioned method, it is preferable that the coating device comprises a body in a form that makes it impregnated with the coating solution. Thus, the coating device can absorb excess of the coating solution, so that the coating solution can be applied in a required minimum amount to the surface of the substrate. Furthermore, it is preferable that the body of the coating device in a form that makes it impregnated with the coating solution is a porous material, such as a resin foam, a woven fabric, or a nonwoven fabric. Particularly, by using a flexible material, substrates of various forms can be handled.

Furthermore, in the above-mentioned method, it is preferable that the step of spreading the coating solution uniformly on the surface of the substrate is carried out by fixing the substrate, and rotating the coating device or moving it in longitudinal and transverse directions, or conducting both simultaneously. Thus, substrates of various forms can be handled with flexibility.

Furthermore, in the above-mentioned method, it is preferable that the coating device for spreading the coating solution uniformly on the surface of the substrate is different from the coating device for increasing the concentration of the silane-based compound and accelerating the elimination reaction between the reactive group of the silane-based compound at least in an amount required for one time application and the active hydrogen on the surface of the substrate. Accordingly, production efficiency can be doubled.

Furthermore, in the above-mentioned method, it is preferable that the step of spreading the coating solution uniformly on the surface of the substrate and the step of accelerating the elimination reaction between the reactive group of the silane-based compound in an amount required for one time application and the active hydrogen on the surface of the substrate are carried out in two independent chambers. The atmospheres in the chambers in these two steps are different, so that productivity of an organic thin film can be increased significantly by providing two chambers with different atmospheres, rather than changing the atmosphere in the chamber in each step.

Next, the apparatus of the present invention includes a device for transporting a substrate from an inlet to an outlet in a chamber; a device for dropping a coating solution containing a silane-based compound and a solvent on a surface of the substrate; a coating device for applying and spreading the coating solution uniformly, in which an elimination reaction between a reactive group of the silane-based compound in an amount required for one time application and an active hydrogen on the surface of the substrate is accelerated; a device for controlling and maintaining a water vapor concentration in an atmosphere in the chamber; and a device for removing the solvent in the coating solution.

In the above-mentioned apparatus, it is preferable that the device for transporting the substrate in the chamber is of a belting system or a roller system.

Furthermore, in the above-mentioned apparatus, it is preferable that the device for dropping the coating solution containing a silane-based compound and a solvent on a surface of the substrate is of a nozzle system or a spray system.

Furthermore, in the above-mentioned apparatus, it is preferable that the device for controlling and maintaining the water vapor concentration in the atmosphere controls and maintains it in the range of more than 0.0076 kg/m$^3$.

Furthermore, in the above-mentioned apparatus, it is preferable that the coating device comprises a body in a form that makes it impregnated with the coating solution.

Furthermore, in the above-mentioned apparatus, it is preferable that the body in a form that makes it impregnated with the coating solution of the coating device is a porous material, such as a resin foam, a woven fabric, or a nonwoven fabric.

Furthermore, in the above-mentioned apparatus, it is preferable that the coating device is rotated or moved in the longitudinal and transverse directions, or both rotated and moved simultaneously.

Furthermore, in the above-mentioned apparatus, it is preferable that the coating device for spreading the coating solution uniformly on the surface of the substrate is different from the coating device for increasing the concentration of the silane-based compound and accelerating the elimination reaction between the reactive group of the silane-based compound at least in an amount required for one time application and the active hydrogen on the surface of the substrate.

Furthermore, in the above-mentioned apparatus, it is preferable that the chamber in which the coating solution is spread uniformly on the surface of the substrate, and the chamber in which the elimination reaction between the reactive group of the silane-based compound in an amount required for one time application and the active hydrogen on the surface of the substrate is accelerated, are two independent chambers.

Furthermore, in the above-mentioned apparatus, it is preferable that the device for removing the solvent in the coating solution from the surface of the substrate is of at least one selected from gas blowing, heating evaporation, and evaporation under reduced pressure.

In the above, it is preferable that at least the surface of the portion of the substrate on which the organic thin film is to be formed is covered with a material comprising glass, a metal, a plastic, or a metal oxide.

In the above, it is preferable that a group having an active hydrogen is exposed on a surface of the plastic.

In the above, it is preferable that the group having an active hydrogen is exposed on a surface of the plastic by oxygen plasma treatment, corona discharge treatment, ozone oxidation treatment, or ultraviolet oxidation treatment.

In the above, it is preferable that the substrate is at least one selected from glass, metals, metal oxides, ceramics, polymer compounds, and composites thereof.

In the above, it is preferable that the substrate is a product made from an inorganic oxide as a raw material, and is at least one selected from glass products including glass sheets and mirrors, ceramic products, enameled products, and composites thereof.

In the present invention, a siloxane bond may be formed between the substrate and the silane-based compound, and a coating film having a thickness of at least 1 nm but not more than 1 $\mu$m may be formed on the substrate.

In the present invention, it is preferable that the silane-based compound contains an alkyl group or a fluoroalkyl group. Specifically, as a compound having a fluoroalkyl group, fluoroalkylsilane compounds represented by a general formula $C_nF_{2n+1}(CH_2)_2SiCl_3$ (n is a positive integer of 1 to 30) such as heptadecafluoro-1,1,2,2-tetrahydrodecyltrichlorosilane are available.

Furthermore, as the solvent in which the chlorosilane-based compound is dissolved, solvents not having an active hydrogen that is reactive with the chlorosilane-based compound may be used. For example, with respect to the above-mentioned fluoroalkylsilane compound, hydrocarbon based solvents, halogenated hydrocarbon based solvents, alkylsiloxane based solvents, silicone oil solvents, and the like may be used. As specific examples of these respective solvents, hydrocarbon based solvents include petroleum solvents represented by a general formula $C_nH_{2n+2}$ (where n is a positive integer) or $C_nH_{2n}$ such as terpene oil. Halogenated hydrocarbon based solvents include those represented by a general formula $C_nH_{2n-m+2}X_m$ (where n is a positive integer; m is a positive integer; X is a halogen) such as octadecafluorooctane. As alkylsiloxane based solvents, linear silicone solvents represented by a general formula $R^1(R^2R^3SiO)_nR^4$ (where n is a positive integer; $R^1$, $R^2$, $R^3$ and $R^4$ are alkyl groups) such as hexamethyldisiloxane, cyclic silicone solvents represented by a general formula $(R^1R^2SiO)_n$ (where n is a positive integer; $R^1$ and $R^2$ are alkyl groups) such as octamethylsiloxane, or arbitrary mixtures of these preferably may be used.

As a method in which an organic thin film is formed by bringing a solution containing the above-mentioned chlorosilane-based compound into contact with a surface of a substrate, a coating solution only in a determined amount required for one time application is dropped on a surface of a substrate, and the coating solution is spread uniformly on the surface of the substrate with a coating device. At this time, it is preferable that the water vapor concentration is maintained within the range of more than 0.0076 kg/m$^3$ but not more than 0.0203 kg/m$^3$. Under this condition, the chlorosilane-based compound may cause an elimination reaction with an active hydrogen of a hydroxyl group etc. on the surface of the substrate, and also molecules of the chlorosilane-based compound cause an elimination reaction with one another to be polymerized due to the presence of water, so that it is firmly bonded to the surface of the substrate. As a result, a coating film excellent in abrasion resistance and durability can be formed.

Furthermore, it is possible to accelerate an elimination reaction between the reactive group of the silane-based compound at least in an amount required for one time application and the active hydrogen on the surface of the substrate by changing the atmosphere around the substrate, increasing the concentration of the silane-based compound, and using the coating device, and then remove the solvent. At this time, molecules of the chlorosilane-based compound also cause an elimination reaction with one another to be polymerized due to the presence of water in the atmosphere, and are bonded firmly to the surface of the substrate.

The following compounds are examples of the silane-based compound that may be used in the present invention:
(1) $CH_3(CH_2)_rSiY_pCl_{3-p}$
(2) $CH_3(CH_2)_sO(CH_2)_tSiY_pCl_{3-p}$
(3) $CH_3(CH_2)_uSi(CH_3)_2(CH_2)_vSiY_pCl_{3-p}$
(4) $CF_3COO(CH_2)_wSiY_pCl_{3-p}$
where p is an integer of 0 to 2; r is an integer of 1 to 25; s is an integer of 0 to 12; t is an integer of 1 to 20; u is an integer of 0 to 12; v is an integer of 1 to 20; and w is an integer of 1 to 25; furthermore, Y is a hydrogen, an alkyl group, an alkoxyl group, a fluorine-containing alkyl group, or a fluorine-containing alkoxyl group.

Furthermore, the following (5) to (11) are specific examples of adsorptive compounds:
(5) $CH_3CH_2O(CH_2)_{15}SiCl_3$
(6) $CH_3(CH_2)_2Si(CH_3)_2(CH_2)_{15}SiCl_3$
(7) $CH_3(CH_2)_6Si(CH_3)_2(CH_2)_9SiCl_3$
(8) $CH_3COO(CH_2)_{15}SiCl_3$
(9) $CF_3(CF_2)_7(CH_2)_2SiCl_3$
(10) $CF_3(CF_2)_5(CH_2)_2SiCl_3$
(11) $CF_3(CF_2)_7C_6H_4SiCl_3$ Furthermore, instead of the above-mentioned chlorosilane type silane-based compounds, isocyanate type silane-based compounds in which isocyanate groups are substituted for all chlorosilyl groups, e.g. the following (12) to (16), may be used:
(12) $CH_3(CH_2)_rSiY_p(NCO)_{3-p}$
(13) $CF_3(CH_2)_rSiY_p(NCO)_{3-p}$
(14) $CH_3(CH_2)_sO(CH_2)_tSiY_p(NCO)_{3-p}$
(15) $CH_3(CH_2)_uSi(CH_3)_2(CH_2)_vSiY_p(NCO)_{3-p}$
(16) $CF_3COO(CH_2)_wSiY_p(NCO)_{3-p}$
where p, r, s, t, u, v, w and Y are the same as the above.

Instead of the above-mentioned adsorptive agents, adsorptive compounds specified in the following (17) to (23) also may be used:
(17) $CH_3CH_2O(CH_2)_{15}Si(NCO)_3$
(18) $CH_3(CH_2)_2Si(CH_3)_2(CH_2)_{15}Si(NCO)_3$
(19) $CH_3(CH_2)_6Si(CH_3)_2(CH_2)_9Si(NCO)_3$
(20) $CH_3COO(CH_2)_{15}Si(NCO)_3$
(21) $CF_3(CF_2)_7(CH_2)_2Si(NCO)_3$
(22) $CF_3(CF_2)_5(CH_2)_2Si(NCO)_3$
(23) $CF_3(CF_2)_7C_6H_4Si(NCO)_3$ Furthermore, as the silane-based compound, materials generally represented by $SiY_k(OA)_{4-k}$ (where Y is the same as the above; A is an alkyl group; and k is 0, 1, 2 or 3) may be used. Among these, substances represented by a formula $CF_3(CF_2)_n(R)_qSiY_p(OA)_{3-p}$ (where n is an integer of at least 1, preferably 1 to 22; R is an alkyl, vinyl, ethynyl or aryl group, or a substituent containing a silicon or oxygen atom; q is 0 or 1; Y, A and p are the same as the above) are used, so that a more excellent anti-fouling coating film can be formed. However, it is not limited to these substances, and for example, $CH_3(CH_2)_rSiY_p(OA)_{3-p}$ and $CH_3(CH_2)_sO(CH_2)_tSiY_p(OA)_{3-p}$, $CH_3(CH_2)_uSi(CH_3)_2(CH_2)_vSiY_p(OA)_{3-p}$ and $CF_3COO(CH_2)_wSiY_p(OA)_{3-p}$ (where p, r, s, t, u, v, w, Y and A are the same as the above) also may be used.

Furthermore, as more specific examples of the silane-based compound, the following (24) to (47) may be used:
(24) $CH_3CH_2O(CH_2)_{15}Si(OCH_3)_3$
(25) $CF_3CH_2O(CH_2)_{15}Si(OCH_3)_3$
(26) $CH_3(CH_2)_2Si(CH_3)_2(CH_2)_{15}Si(OCH_3)_3$
(27) $CH_3(CH_2)_6Si(CH_3)_2(CH_2)_9Si(OCH_3)_3$
(28) $CH_3COO(CH_2)_{15}Si(OCH_3)_3$
(29) $CF_3(CF_2)_5(CH_2)_2Si(OCH_3)_3$
(30) $CF_3(CF_2)_7C_6H_4Si(OCH_3)_3$
(31) $CH_3CH_2O(CH_2)_{15}Si(OC_2H_5)_3$
(32) $CH_3(CH_2)_2Si(CH_3)_2(CH_2)_{15}Si(OC_2H_5)_3$
(33) $CH_3(CH_2)_6Si(CH_3)_2(CH_2)_9Si(OC_2H_5)_3$
(34) $CF_3(CH_2)_6Si(CH_3)_2(CH_2)_9Si(OC_2H_5)_3$
(35) $CH_3COO(CH_2)_{15}Si(OC_2H_5)_3$
(36) $CF_3COO(CH_2)_{15}Si(OC_2H_5)_3$
(37) $CF_3COO(CH_2)_{15}Si(OCH_3)_3$
(38) $CF_3(CF_2)_9(CH_2)_2Si(OC_2H_5)_3$
(39) $CF_3(CF_2)_7(CH_2)_2Si(OC_2H_5)_3$
(40) $CF_3(CF_2)_5(CH_2)_2Si(OC_2H_5)_3$
(41) $CF_3(CF_2)_7C_6H_4Si(OC_2H_5)_3$
(42) $CF_3(CF_2)_9(CH_2)_2Si(OCH_3)_3$
(43) $CF_3(CF_2)_5(CH_2)_2Si(OCH_3)_3$
(44) $CF_3(CF_2)_7(CH_2)_2SiCH_3(OC_2H_5)_2$
(45) $CF_3(CF_2)_7(CH_2)_2SiCH_3(OCH_3)_2$
(46) $CF_3(CF_2)_7(CH_2)_2Si(CH_3)_2OC_2H_5$
(47) $CF_3(CF_2)_7(CH_2)_2Si(CH_3)_2OCH_3$ In the following, specific examples of the method for producing an organic thin film, the apparatus for producing an organic thin film, and the organic thin film according to the present invention are described.

EXAMPLE 1

A glove box made of a transparent vinyl chloride was prepared, and was provided with a temperature sensor and a humidity sensor. The water vapor concentration in the glove box was controlled constantly by measuring the temperature and relative humidity in the glove box. The glove box had a construction in which dry air was introduced from a dry air generator as needed through a pipe so as to control the water vapor concentration. It also had a construction in which air passed through a humidifier was introduced as needed through a pipe.

In the glove box, a glass sheet of 5 cm square, a vial containing an agent of octadecyltrichlorosilane (produced by Shin-Etsu Chemical Co., Ltd.) only in a required amount, and a glass container to contain the agent were placed. It was ensured that the temperature in the glove box was stable in the range of 25 to 27° C. for 15 minutes, and the relative humidity in the glove box was stable in the range of 50 to 56% for 15 minutes. These ranges of the temperature and relative humidity indicate that the water vapor concentration is stable in the range of 12 g to 15 g per cube meter.

Under this condition, one's hand was inserted in the glove box to put the agent in the glass container, and the glass sheet was immersed in the agent in the glass container. After immersing it for one minute, the glass sheet was taken out, and a surface of the glass sheet was rubbed with a waste (cloth) in the glove box to wipe off excess solution, dirt, etc. Then, the glass sheet was taken out of the glove box. The glass sheet retained its transparency. Furthermore, although the glass sheet before treatment was wet well with water, the glass sheet after the above-mentioned treatment exhibited water repellency when immersed in water and pulled out, and water fell as if flowing. Thus, it was concluded that an organic thin film had been formed by a reaction of octadecyltrichlorosilane at least in an amount required for one time application with the substrate.

EXAMPLE 2

The same type of experiment as in Example 1 was carried out in an atmosphere having a high water vapor concentration of 20.3 g per $m^3$. A phenomenon on a surface of a glass sheet suggesting a formation of an organic thin film was confirmed in the same way as in Example 1.

EXAMPLE 3

In a clean booth controlled for temperature at 20° C.±2° C. and for relative humidity at 50%±5%, an organic thin film was formed using a substrate in which a slide was subjected to aluminum evaporation and further to sputtering with silicon dioxide. In these controlled ranges of temperature and humidity, the water vapor concentration ranged from 7.0 g to 11.0 g per cube meter. A solution of 1% 18-nonadecenyltrichlorosilane (produced by Shin-Etsu Chemical Co., Ltd.) in anhydrous hexane (produced by Wako Pure Chemical Ind., Ltd.) was prepared, and the solution was applied to the substrate with a brush. After five minutes, the surface of the substrate was rubbed with a nonwoven fabric containing anhydrous hexane. Using this substrate, an infrared absorption spectrum was measured by reflection method. As a result of spectrum analysis, two spectra resulting from $CH_2$ stretching vibrations were observed near 2900 $cm^{-1}$ and 2850 $cm^{-1}$, and a spectrum resulting from a CH stretching vibration of an alkene was observed near 1650 $cm^{-1}$. As a result, it appeared that 18-nonadecenyltrichlorosilane caused a hydrogen chloride elimination reaction on the surface of the substrate to form a film. Furthermore, the surface energy was 33 mN/m, and it was estimated that an organic compound different from a silicon oxide had been formed on the surface of the substrate.

Moreover, the system for controlling the water vapor concentration as shown in Example 1 is a very simple, laboratory one, and it has a satisfactory construction in which a gas having a controlled water vapor concentration is introduced.

Furthermore, when a dry gas and a humid gas are introduced separately into a place in which a reaction is caused (referring to the glove box in this example) as in this example, in order to avoid a localized water vapor concentration outside of the controlled range, a pre-chamber in which humidities of gases to be introduced are adjusted may be provided. Particularly, when the glove box has a small size, it is preferably provided with a pre-chamber.

Furthermore, in Example 1, although excess agent, dirt etc. were removed from the surface by rubbing with a cloth (waste), if excess agent can be removed naturally, for example, by controlling viscosity of the agent or using an agent that can be evaporated easily, rubbing on the surface is of course unnecessary. Moreover, if there is any measure to drain a liquid from the agent using an air gun etc., rubbing on the surface also is unnecessary. The same also applies to Example 3.

EXAMPLE 4

This example describes a method and an apparatus for producing a coating film, using a rotational coating film-forming apparatus as an example of an apparatus for producing a coating film of the present invention.

FIG. 1 is a schematic diagram of a rotational coating film-forming apparatus. In FIG. 1, a substrate is moved from left to right, and during the process a coating film is formed on a surface of the substrate.

In a chamber 1, air was supplied constantly through an air flow pipe 2 as shown by an arrow A so as to control and maintain the water vapor concentration in the chamber 1 in the range of higher than 0.0076 $kg/m^3$. A belt conveyor 3 was provided at an inlet for a substrate. An enamel plate 4 as a substrate to be coated with an organic thin film was placed on the belt conveyor 3, and automatically it was introduced into the chamber as shown by an arrow B. Then, the enamel plate 4 was positioned on a support 5.

Figure 2:
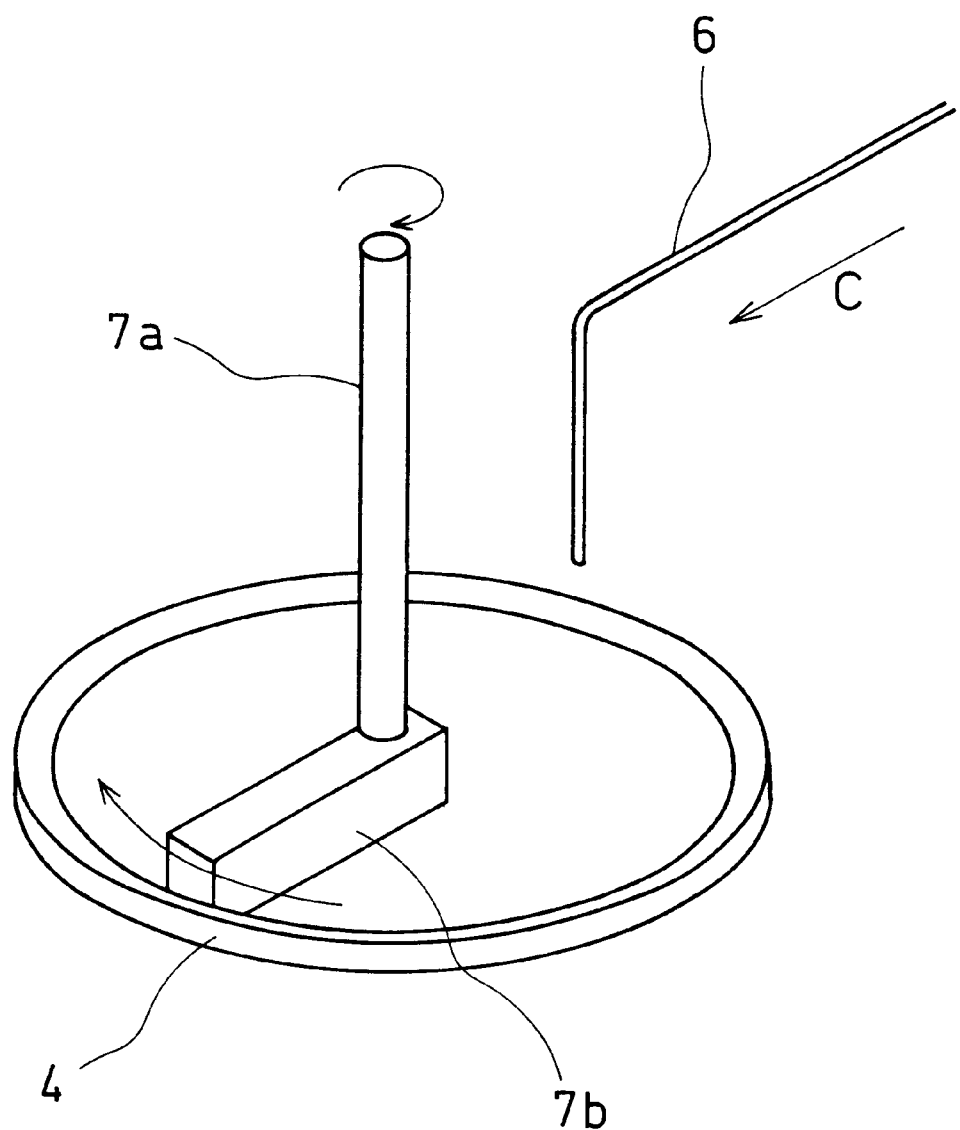
FIG. 2 is a perspective view showing a coating method according to Example 4 of the present invention.

FIG. 2 is a perspective view showing selectively a rotational coating section in FIG. 1. A nozzle 6 connected to a container for supplying a coating solution was moved as shown by an arrow C, and a coating solution was measured in an amount required for one time application, for example, in an amount of 0.6 ml to 0.8 ml per a plate with a diameter of 20 cm. The measured coating solution, which is described below, was dropped on the enamel plate 4 at each time of application. The coating solution comprised a solution in which one weight part of heptadecafluoro-1,1,2,2-tetrahydrodecyltrichlorosilane was dissolved in 100 weight parts of a cyclic silicone oil, both of which agents were produced by Shin-Etsu Chemical Co., Ltd.

Then, an axis 7a of a coating device was rotated, and a surface of the enamel plate 4 was rubbed uniformly with a nonwoven fabric 7b. Thus, the coating solution was applied on the entire surface of the enamel plate 4. In the case of a plate with a diameter of 20 cm, application of the coating solution on the entire surface was able to be completed in several seconds.

Next, the enamel plate was transported by a belt conveyor 8 and sent to another chamber 9. In the chamber 9, a warm air was supplied through an airflow pipe 10 as shown by an arrow D, and the temperature in the chamber was maintained at higher than room temperature. The enamel plate 11 sent to the chamber 9 was positioned on a support 13, and the coating device 12a was rotated, so that a surface of the enamel plate was rubbed uniformly with a nonwoven fabric 12b. The coating solution spread uniformly on the enamel plate by this operation caused an elimination reaction with a vitreous component on the surface of the enamel plate. As a result, as shown in FIG. 2, an organic thin film 16 covalently bonded to an enamel plate 15 was formed. The solvent in the coating solution was removed using the atmosphere in the chamber 9, and only the organic thin film 16 remained on the enamel plate 15.

Next, the enamel plate 11 was discharged from the chamber 9 by a belt conveyor 14 as shown by an arrow E. Thus, a finished product of the enamel plate 15, in which an organic thin film was formed on a surface, was obtained.

Figure 3:
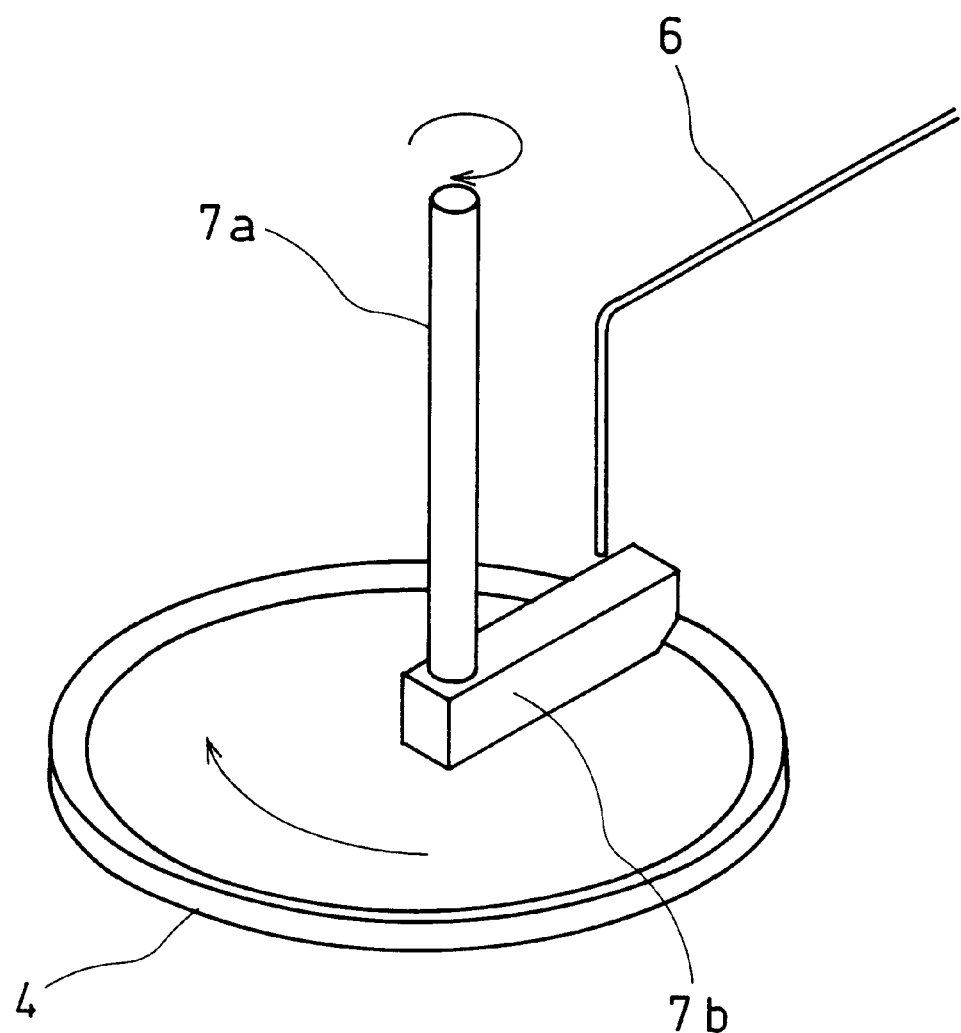
FIG. 3 is a perspective view showing a coating method according to Example 4 of the present invention.
Figure 4:
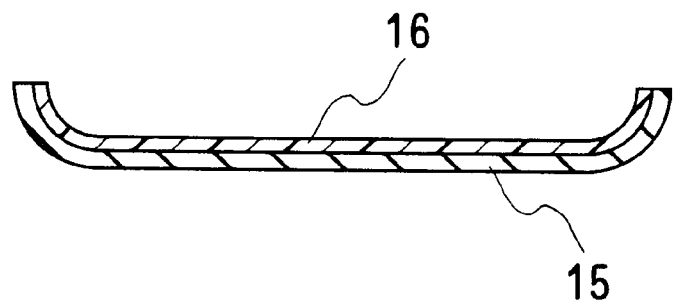
FIG. 4 is a schematic diagram of a cross section of a substrate and a coating film formed on the substrate according to Example 4 of the present invention.

Moreover, although the agent was dropped directly on the enamel plate in this example, the same film also was able to be formed by dropping the agent to a nonwoven fabric and causing it to be absorbed by the nonwoven fabric, followed by rotating the axis of the coating device as shown in FIG. 3.

Comparative Example 1

To confirm the effect of the method of the present invention, a film having a siloxane bond was produced by a conventional method. The role of maintaining the water vapor concentration has been described in the above example, while the cases in which the water vapor concentration was not maintained also have been exemplified.

Using the same heptadecafluoro-1,1,2,2-tetrahydrodecyltrichlorosilane (1 weight %) as in the above example as a chlorosilane-based compound, and using octamethylcyclotetrasiloxane as a solvent, the above-mentioned mixed solution was prepared in a vat. The atmosphere provided in the vat containing the solution was maintained for its water vapor concentration to be in the above-mentioned range, and the same enamel plate as in Example 1 was immersed in the solution. The immersion was carried out for 15 minutes, and then air-drying of the solvent was performed for 15 minutes.

The state of the surface of the glass sheet after completing the film forming was measured by dropping water and using an angle formed by a water drop and the glass sheet (a contact angle).

Table 1 below shows results of comparison between Example 1 and Comparative Example 1.

TABLE 1

| Item of Comparative Evaluation | Production Method of Example 1 (Rotational Coating) | Conventional Production Method (Comp. Example 1) (Immersion) |
| --- | --- | --- |
| Measured Contact Angle (degree) | 110 | 110 |
| Visual Inspection of Appearance | No Adhered Material | White Material Was Adhered |
| Amount of Solution (g) | 0.75 | 1800 |
| Time for Forming a Film | 20 seconds | 30 minutes |

Table 1 shows a comparison between the case in which a film was formed on an enamel plate by the method shown in the example and the case in which a film was formed on the same enamel plate by the method shown in the comparative example, with respect to contact angle, visual inspection of appearance, amount of solution prepared, and time for forming a film. Both of the contact angles of the formed films were 110 degree, and the states of the surfaces were the same. On the other hand, in the conventional method, because the specified condition of water vapor concentration after immersion was incomplete, many adhered white materials were generated on the glass sheet according to visual inspection of appearance. However, in the method of the present invention, such an adhered material was not confirmed.

Furthermore, according to the method of the present invention, the amount of the solution of the chlorosilane-based compound used per one enamel plate was 0.75 g. In the conventional method, because the solution was prepared in an amount required for immersing the enamel plate, 1800 g of the solution, which was 2400 times larger than the amount in the present invention, was required. In the conventional method, the solution after preparing a film on a first substrate contains enough chlorosilane-based compound to form a film, so that of course a film can be formed when a second substrate is immersed in that solution, and films can be formed on a plurality of substrates. Thus, it cannot be generally said that an amount exceeding 2000 times is required. However, although a film can be formed with a proper amount of the solution at each time according to the method of the present invention, it is necessary to prepare as much as 1800 g of the solution in this example of the conventional immersion method, even when a film is to be formed on a single substrate. Thus, the method of the present invention is more excellent than the conventional method to form a film depending on the requirements for each production. Accordingly, the cost required for forming a film can be reduced. Moreover, the method of the present invention is also more excellent than the conventional method in terms of storability of the solution, etc.

Furthermore, there was an obvious difference in the time for forming a film. In the example of the present invention, a film was able to be formed on a single enamel plate in 20 seconds, and moreover, it was confirmed that the film was free of problems in visual inspection of appearance. On the other hand, in the conventional immersion method, 30 minutes was required to form a film, and this was 90 times longer than the time required in the present invention. Also, the quality of the formed product was not very good. Thus, there is also a large difference in the number of films formed per unit time, and this also shows that the present invention is excellent in reducing the cost of forming a film.

Another difference between the method of the present invention and the conventional immersion method is that while a film is formed on one side of a substrate in the present invention, a film is formed on both sides in the conventional method. If it is necessary to form a film only on one side by the conventional method, measures must be taken in advance to cover the side not needed to be coated, so that no reaction of forming a film may occur on that side. Moreover, when effect on only one side is sufficient, because films are formed on both sides in the conventional method, an excess film is formed on an unneeded side, and the cost of forming a film is doubled.

Comparative Example 2

As a comparative example, a roll coating method is mentioned. JP-10-180179 A shows details of this method. The roll coating method is very excellent to form a film on a flat plate. However, if the substrate is not a flat plate as shown in Example 1, the roll coating method cannot be used. This indicates an obvious difference.

Comparative Durability Test

Durability was evaluated for the enamel plate coated with an organic thin film as produced in Example 1, and an enamel plate produced in an atmosphere having a water vapor concentration of less than 0.0076 $kg/m^3$. As an example of a fouling, a mixture of sugar and soy source (1:1 by weight ratio) was applied to the enamel plate coated with an organic thin film, heated to a high temperature of 300° C. for 20 minutes and cooled, and then the fouling baked and adhered to the enamel plate was removed by rubbing it with a wet cloth by one's hand. This was because wiping off with one's hand was the most practical measure to remove a fouling. The operation was repeated until the fouling was not able to be removed, and the number of repeated cycles was counted. Table 2 shows the result.

TABLE 2

| Water Vapor Concentration ($kg/m^3$) | 0.0021 | 0.0060 | 0.0076 | 0.0150 | 0.0169 | 0.0203 |
|---|---|---|---|---|---|---|
| Number of Possible Fouling Removal | 0 | 2 | 6 | 8 | 6 | 5 |
| Evaluation | X | X | ○ | ◉ | ○ | ○ |

In Table 2, ◉ indicates at least 8 times of possible fouling removal (determined as the best durability and abrasion resistance with practicability); ○ indicates at least 5 but less than 8 times of possible fouling removal (determined as good durability and abrasion resistance with practicability); and X indicates less than five times of possible fouling removal (determined as poor durability and abrasion resistance without practicability).

As a result of this test, it was evident that durability was poor in the cases of low water vapor concentrations, and a sharp increase in durability was confirmed with a borderline at about 0.0076 $kg/m^3$ of water vapor concentration. Thus, the organic thin films formed with a water vapor concentration of higher than 0.0076 $kg/m^3$ did not peel off, and exhibited very good abrasion resistance as thin films. Moreover, in this environmental test, it was impossible to produce an atmosphere having a water vapor concentration of higher than 0.0203 $kg/m^3$.

As mentioned above, the organic thin film formed on a substrate by the method of the present invention was free of a white adhered material, and had more durability than a film formed by the conventional method.

When the enamel plate obtained as in the above was used as a heat cooking plate in a microwave or electronic oven, a fouling was able to be wiped off easily. Moreover, it also had durability and was very useful.

EXAMPLE 5

Figure 5:
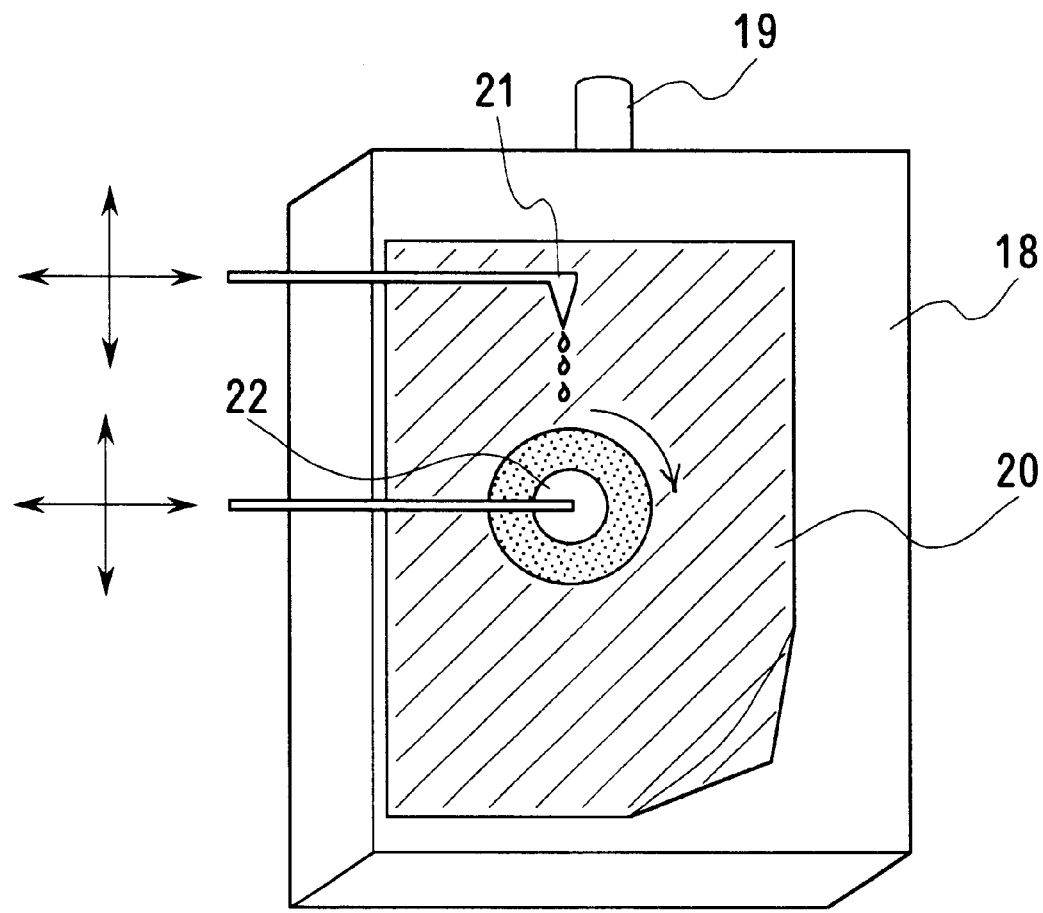
FIG. 5 is a schematic diagram of a coating device according to Example 5 of the present invention.

A coating device shown in FIG. 5 was placed in a room (chamber) in which a water vapor concentration in air was controlled and maintained in the range of more than 0.0076 $kg/m^3$. For perfect operation, the coating device was provided with a cover 18 and an air supply pipe 19 for supplying air having an adjusted water vapor concentration, particularly in a section for forming an organic thin film, so that an artificial increase in the water vapor concentration was inhibited. A glass sheet 20 having a bend in part (for example, a glass sheet having a bend extending upward only at the right lower angle is illustrated in FIG. 5) was set in the coating device by hand. The glass sheet was not placed horizontally as in Example 1, but was placed in an obliquely vertical direction. A nozzle 21 extended from a side, and the same coating solution as in Example 1 was dropped from the nozzle 21 on a surface of the glass sheet. At the same time, the coating solution was spread uniformly on the surface of the glass sheet with a sponge coater 22 attached to a crossarm extending from a side. The nozzle and the sponge coater were simultaneously moved up and down and right and left in concert as shown by an arrow in FIG. 5, spreading the solution uniformly on the glass sheet while dropping it. The sponge coater was rotated to enable easy spreading of the coating solution. The sponge coater dealt with the bend of the glass sheet by deforming, and made it possible to coat the bend smoothly.

Figure 6:
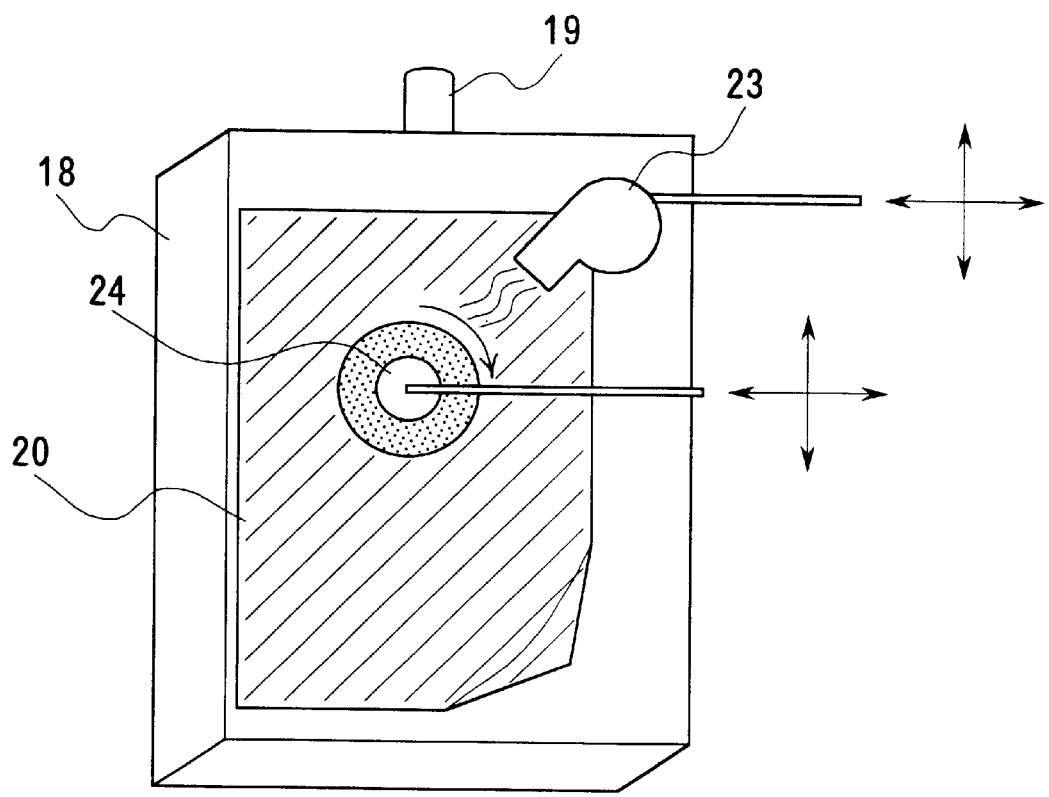
FIG. 6 is a schematic diagram of a coating device according to Example 5 of the present invention.

Next, as shown in FIG. 6, a dryer 23 having an opening for blowing a dry warm air and a sponge coater 24 different from the above sponge coater were used to form an organic thin film. A glass surface of the glass sheet 20 applied with a coating solution was rubbed with the sponge coater, and at the same time a dry warm air was applied thereto so as to form an organic thin film. The dryer 23 having an opening for blowing a dry warm air and the sponge coater 24 were simultaneously moved up and down and right and left in concert as shown by an arrow in FIG. 6. Then, the glass sheet 20 was removed by one's hand.

According to this device and the method for forming an organic thin film, an organic thin film comprising mainly carbon fluoride was able to be formed on a special shaped glass sheet having a bend in part (e.g. a windshield glass of an automobile).

Although two chambers were used in Example 1, the treatment can be performed with one chamber, if the water vapor concentration can be controlled and maintained, and if the atmosphere does not change when warm air required in the next step is supplied.

Furthermore, although warm air was used in Example 1, the change of the atmosphere in the chamber also can be accomplished by changing the gas flow rate or the temperature of the substrate. In the case of changing the gas flow rate, it can be accomplished by providing a nozzle near the coating device and supplying air or the like from the nozzle. In the case of changing the temperature of the substrate, it can be accomplished by providing the support with a heating device to increase the temperature of the substrate. Of course, it also may be carried out by other measures.

Furthermore, although a method in which the water vapor concentration in the entire room is controlled and maintained is shown in Example 5, because a change from people coming in and out cannot be dealt with in practice, the cover was provided. The cover was necessary only in this example, and it is not required if the water vapor concentration in the entire room can be controlled with more precision.

Furthermore, although the coating solution was supplied by dropping it with a nozzle in Examples 1 and 5, it also can be supplied as a spray or a mist.

As mentioned above, according to the present invention, a film can be formed on an irregular shaped substrate of a large size, and productivity can be improved considerably compared to the conventional immersion method, so that production cost can be reduced considerably. Thus, it has a large industrial value.

EXAMPLE 6

Figure 7:
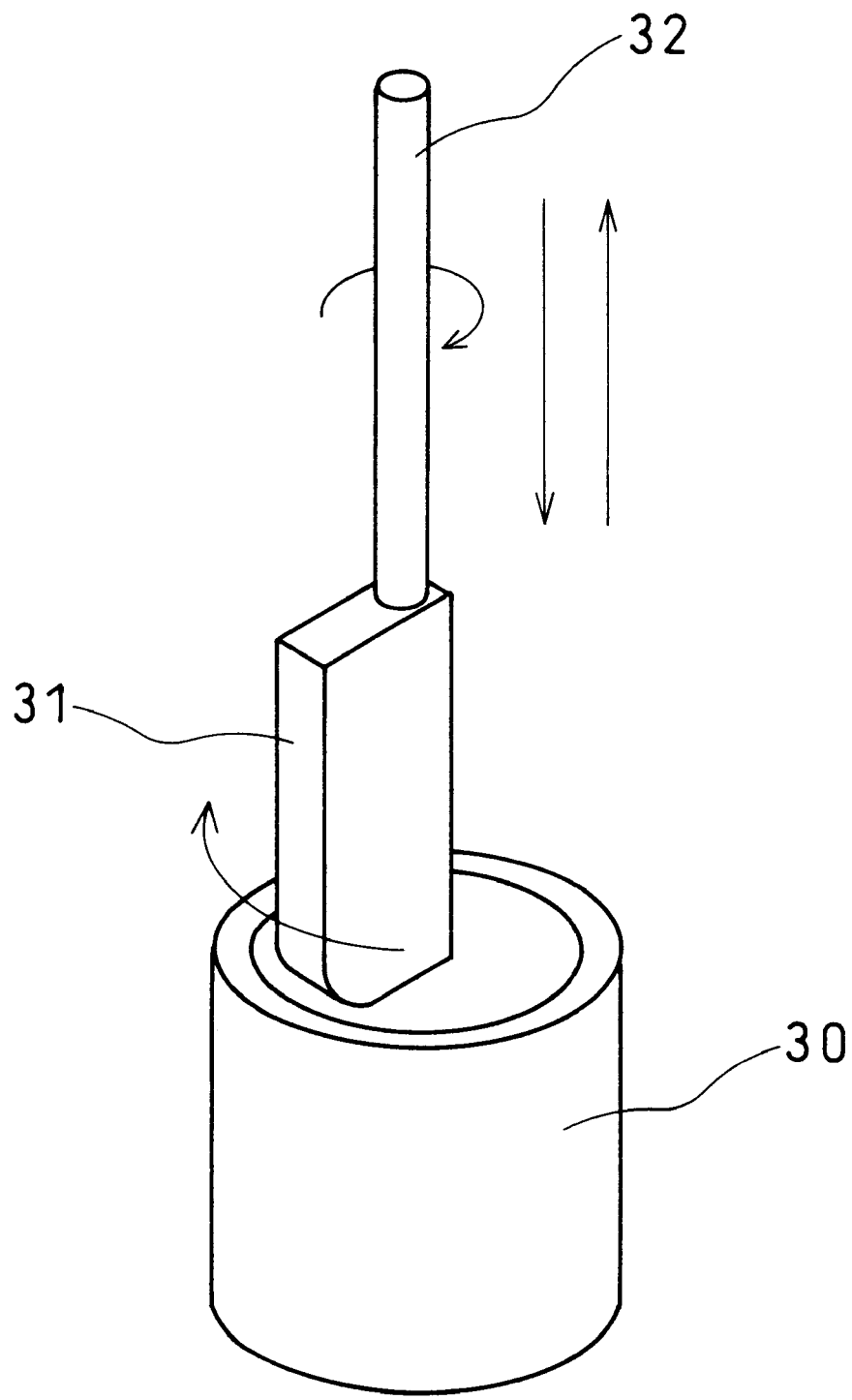
FIG. 7 is a perspective view showing a coating method according to Example 6 of the present invention.

FIG. 7 is a schematic diagram of a rotational coating film-forming apparatus of one example of the present invention. When forming an organic thin film on an inner surface of a hollow ceramic substrate 30 having a bottom, which is called a cocotte (a soup container), an organic thin film can be formed on the inner surface by using a sponge wiper 31 contacting the inner surface and rotating the wiper with a rotational axis 32. When the hollow substrate is long in shape, an organic thin film can be formed by moving the rotational axis 32 up and down to move the wiper 31 up and down. Moreover, in the process of forming an organic thin film shown in FIG. 7, the water vapor concentration is controlled and maintained in the range of more than 0.0076 kg/m$^3$. When applying an agent to a substrate of such a shape, it is preferable that the agent is supplied by causing it to be absorbed by the wiper as shown in Example 1.

EXAMPLE 7

Figure 8:
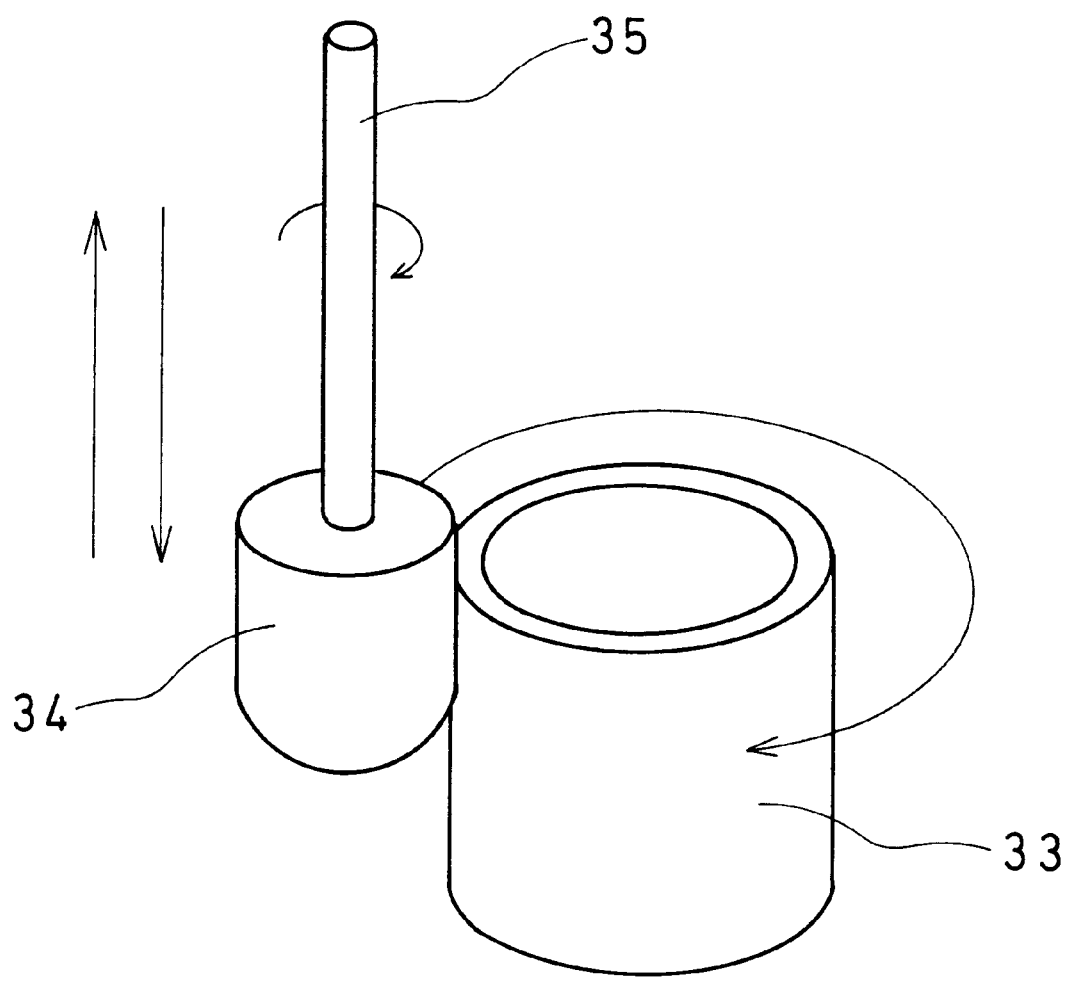
FIG. 8 is a perspective view showing a coating method according to Example 7 of the present invention.

FIG. 8 is a schematic diagram of a rotational coating film-forming apparatus of one example of the present invention. When forming an organic thin film on an outer surface of a cylindrical substrate 33, such as a soup container or a glass tumbler as in Example 6, an organic thin film can be formed on the outer surface by using a cylindrical sponge wiper 34 contacting the outer surface and rotating the wiper with a rotational axis 35. When the outer surface is long, a uniform organic thin film can be formed by moving the rotational axis 35 up and down to move the wiper 34 up and down as shown in FIG. 8. When applying an agent to a substrate of such a shape, it is preferable that the agent is supplied by causing it to be absorbed by the wiper as shown in Example 1. Moreover, in the process of forming an organic thin film shown in FIG. 8, the water vapor concentration is controlled and maintained in the range of more than 0.0076 kg/m$^3$.

EXAMPLE 8

Figure 9:
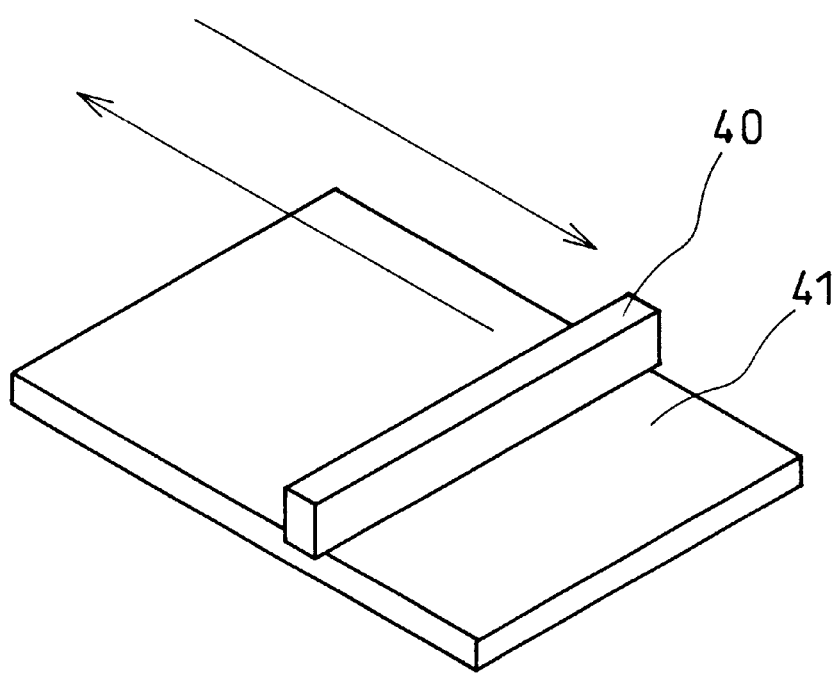
FIG. 9 is a perspective view showing a coating method according to Example 8 of the present invention.

A case in which an organic thin film of the present invention is formed on a flat plate is described. As shown in FIG. 9, an organic thin film can be formed by using a sponge wiper 40 corresponding to the length of one side of a flat plate 41 and dropping an agent on the flat plate 41 or onto the wiper, and then moving the wiper 40 on the flat plate 41 as shown by an arrow in FIG. 9. Other conditions are the same as in Example 1.

EXAMPLE 9

Figure 10:
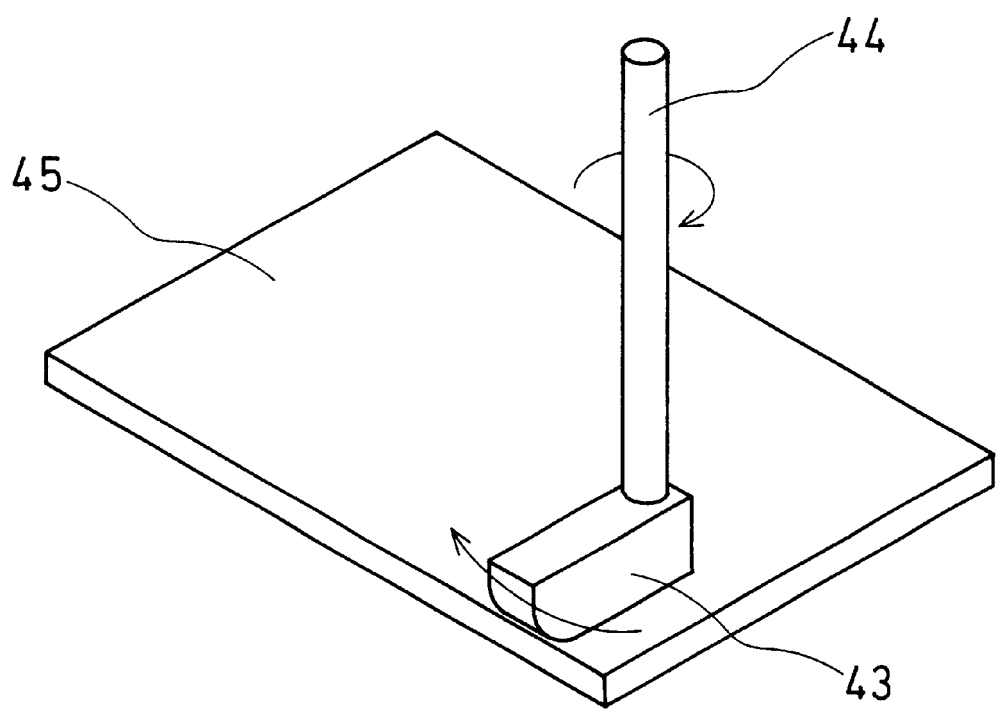
FIG. 10 is a perspective view showing a coating method according to Example 9 of the present invention.

A case in which an organic thin film of the present invention is formed on a flat plate is described. As shown in FIG. 10, a uniform organic thin film can be formed by dropping an agent on a flat plate 42 or onto the wiper, and then moving the flat plate 42 while rotating a sponge wiper 43 with a rotational axis 44, or moving the rotational axis 44 back and forth and right and left. Other conditions are the same as in Example 1.

EXAMPLE 10

Figure 11:
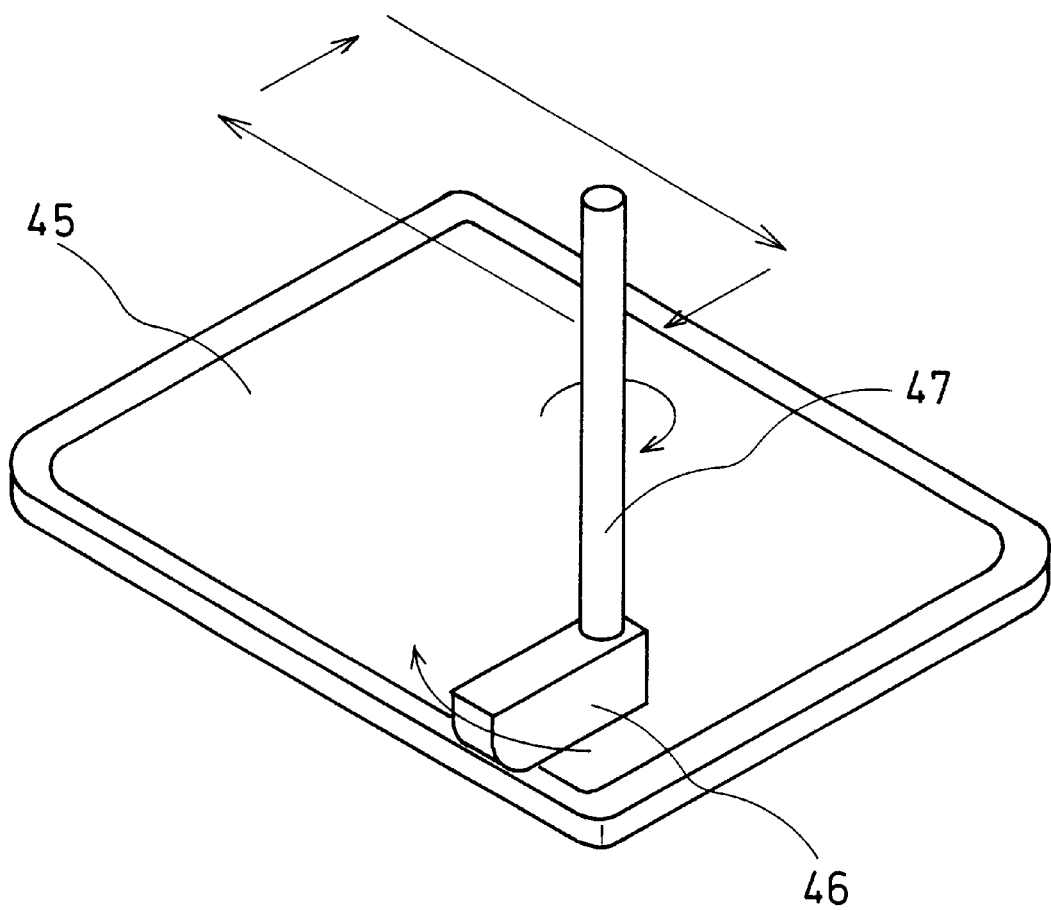
FIG. 11 is a perspective view showing a coating method according to Example 10 of the present invention.

A case in which an organic thin film of the present invention is formed on a flat plate 45 having a swelling at its periphery as shown in FIG. 11 (a cooking tray for restaurant) is described, among cases in which an organic thin film of the present invention is formed on a flat plate. A uniform organic thin film can be formed by using a sponge wiper 46 as shown in FIG. 11, whose end is curved corresponding to the swelling of the plate, and a rotational axis 47 capable of moving back and forth and right and left as shown by an arrow in FIG. 11. Furthermore, an organic thin film also can be formed by moving the flat plate 45 back and forth and right and left, instead of moving the rotational axis 47 back and forth and right and left as in Example 9. Other conditions are the same as in Example 1.

EXAMPLE 11

Figure 12:
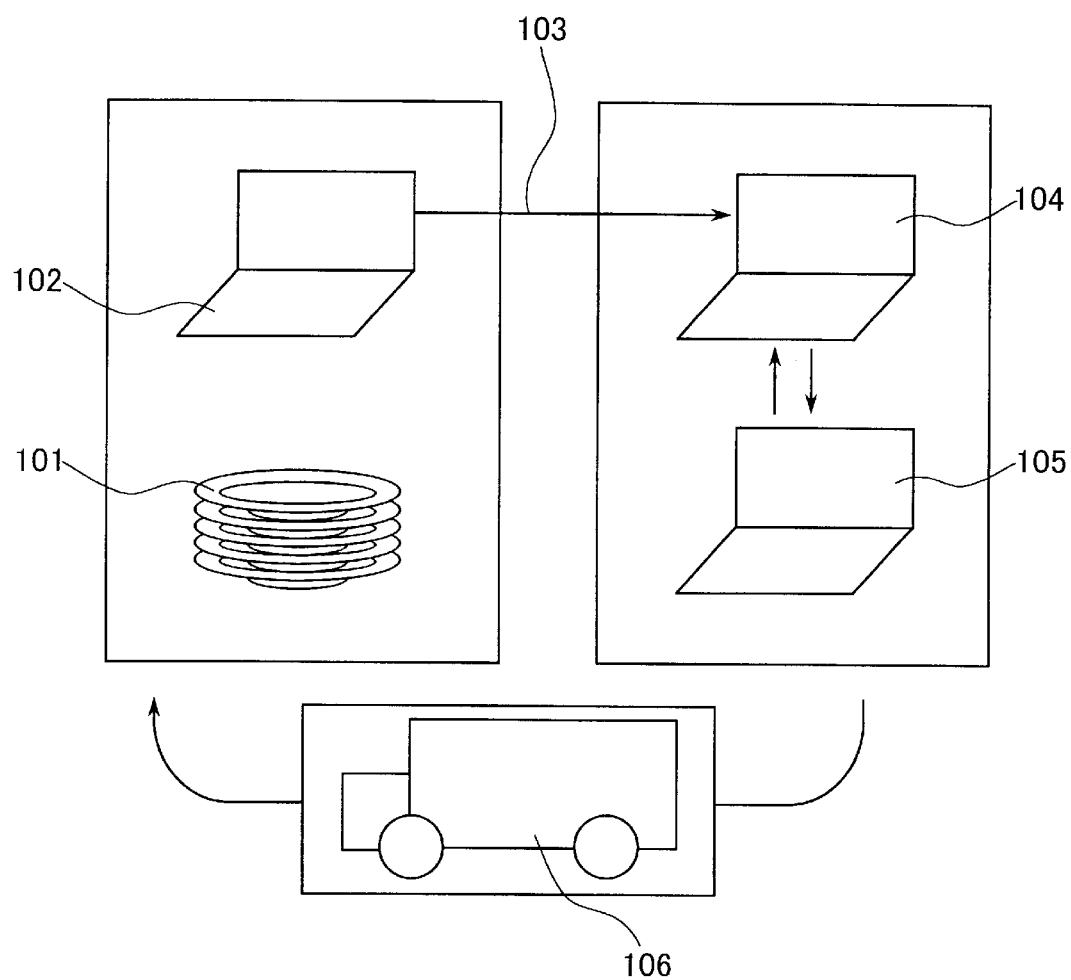
FIG. 12 is a flow diagram showing a mechanism of a repair system for ceramic and glass products according to Example 11 of the present invention.

FIG. 12 shows a flow diagram to explain the following example.

A restaurant-managing company A owns ceramic and glass products for food and drink (plates (101) are exemplified here), which has been processed for a water repellent surface treatment. Because these products has generated irregularity in the surface treatment, the company A decides to proceed to repair the surface treatment of these products on the next regular holiday. The company A transmits a request for repair treatment to a water repellent surface treatment company B through the Internet work 103 as an information transfer system, using a personal computer 102 as an information transmitter. The company B receives the request from the company A using a personal computer 104, which is an information receiver present in the company B. The company B also can obtain information on the location and method of contact of the company A, and contents of the articles for treatment (e.g. date of the latest treatment, number and materials of the articles owned by the company A, content of the surface treatment, etc.) using a personal computer 105, which is an information processing mechanism present in the company B. The company B also prepares to send a product-repair system 106 to the company A on the date specified by the company A.

The company B provides the product-repair system 106 owned by the company B on the date and at the location specified by the company A. The company carries out a surface treatment of the plates 101, which are representative examples of the ceramic and glass products for food and drink requested for treatment by the company A. Then, right after the treatment, the company B delivers the products to the company A.

Furthermore, although the Internet has been described as an example of an information transfer system, as long as the same function can be realized, other methods such as a simple information transfer system using a telephone line etc. also may be used.

Furthermore, although a personal computer also has been described as an example of an information transmitter, as long as the same function can be realized, a digital phone or a digital facsimile etc. also may be used as an information transmitter.

Furthermore, although a personal computer has been described as an example of an information receiver, as long as the same function can be realized, a digital phone or a digital facsimile etc. also may be used as an information receiver.

Furthermore, when there is a function of selecting and providing information on the address etc. of the source of the transmitted information and the articles, it is not necessary to use a personal computer as shown in the example. Therefore, large-sized computers, mechanical information selectors, data cards, and the like also can be used as an information processing mechanism for substitute.

Figure 13:
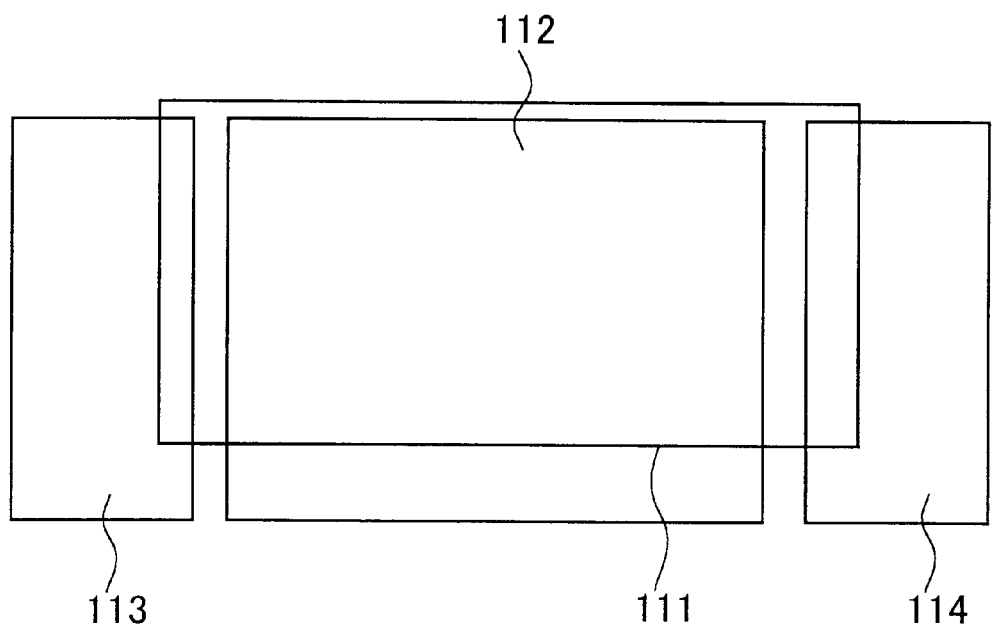
FIG. 13 is a schematic diagram of a product-repair system according to Example 11 of the present invention.

FIG. 13 is a scheme of a product-repair system, which comprises a temperature and humidity controlling device 111 and a chlorosilane-based material reaction device 112, and further provided with a product-for-repair supplying device 113 and a product-after-repair collecting device 114. The product-for-repair supplying device 113 has a mechanism for conveying a product for repair, which is usually of a belting system. A product for repair can be put in the chlorosilane-based material reaction device 112 by conveyance. The chlorosilane-based material reaction device comprises a rubbing film-forming structure, a material-supplying structure, an exhauster and a ventilator. The product-after-repair collecting device 114 is of a belting system, and can collect products after repair by conveyance. The temperature and humidity controlling device controls the temperature and humidity of the entire product-repair system, and particularly controls strictly the temperature and humidity in the vicinity of the chlorosilane-based material reaction device.

Furthermore, although the product-for-repair supplying device 113 and the product-after-repair collecting device 114 have been described as being of a belting system, a roller system or a chuck system also may be employed as needed.

Furthermore, although a rubbing system has been exemplified in the chlorosilane-based material reaction device 112, when the device has a mechanism for spreading an agent uniformly on a substrate such as a spray system or a roll system, such may be substituted.

Figure 14:
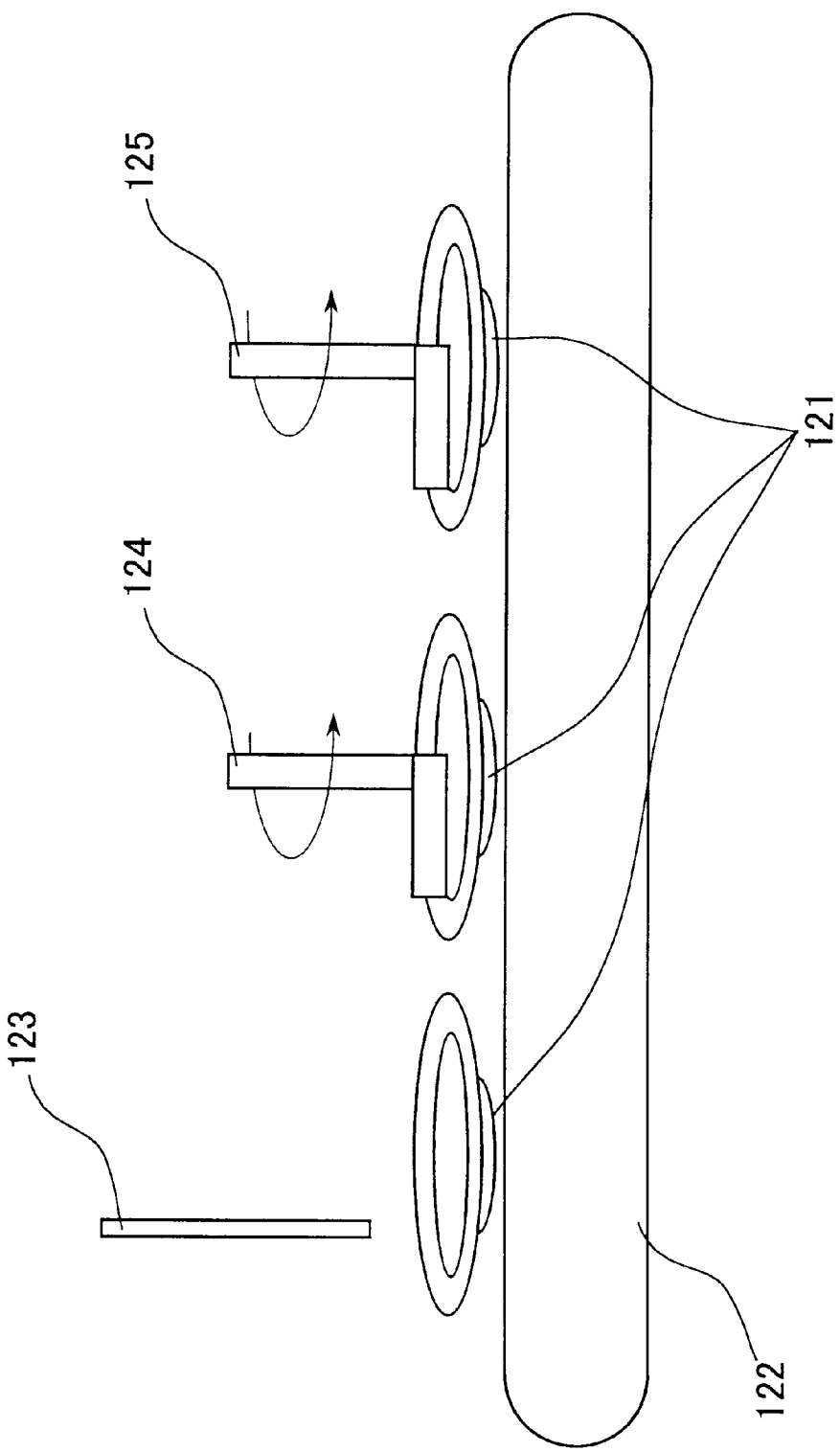
FIG. 14 is a diagram showing a mechanism of film repairing according to Example 11 of the present invention.

Referring to FIG. 14, a film-forming mechanism of a rubbing system is described in detail. A ceramic plate 121 for a surface to be repaired (a plate is herein exemplified as a substrate) is placed on a carrier belt 122, moved under an agent-dropping nozzle 123, and a chlorosilane-based material is dropped from the nozzle 123. The dropped chlorosilane-based material is spread uniformly by rotating a rotational jig 124 for application and reaction (the portion of the jig contacting the plate is surrounded with a cloth). At this time, a hydroxyl group having an active hydrogen is exposed in a portion in which a film is peeled and the plate substrate is bared. The hydroxyl group and the chlorosilane group of the material cause a hydrogen chloride elimination reaction to generate a chemical bonding with the substrate, so that a film of the material is formed on the portion in which a hydroxyl group is exposed. On the other hand, in a portion in which a film still remains, because a hydroxyl group having an active hydrogen is not exposed, the agent is put on the plate without causing a reaction between the material and the plate.

In the next step, excess of the material is wiped out with a cloth similarly surrounding a rotational jig 125 for wiping. At this time, the material put on the plate without causing a reaction is wiped out with this cloth, and repair is completed.

Furthermore, it is also possible to form a new film after peeling the entire film prior to the film-forming treatment. In this case, an agent for peeling the film is required. When the film has been formed using a chlorosilane-based material, an alkaline solution is suitably used for the peeling, and a turbid solution containing an abrasive also may be used to remove the film. When the film has been formed using a material other than a chlorosilane-based material, it can be removed easily with an organic solvent etc. Then, the above-mentioned film-forming treatment is carried out.

Figure 15:
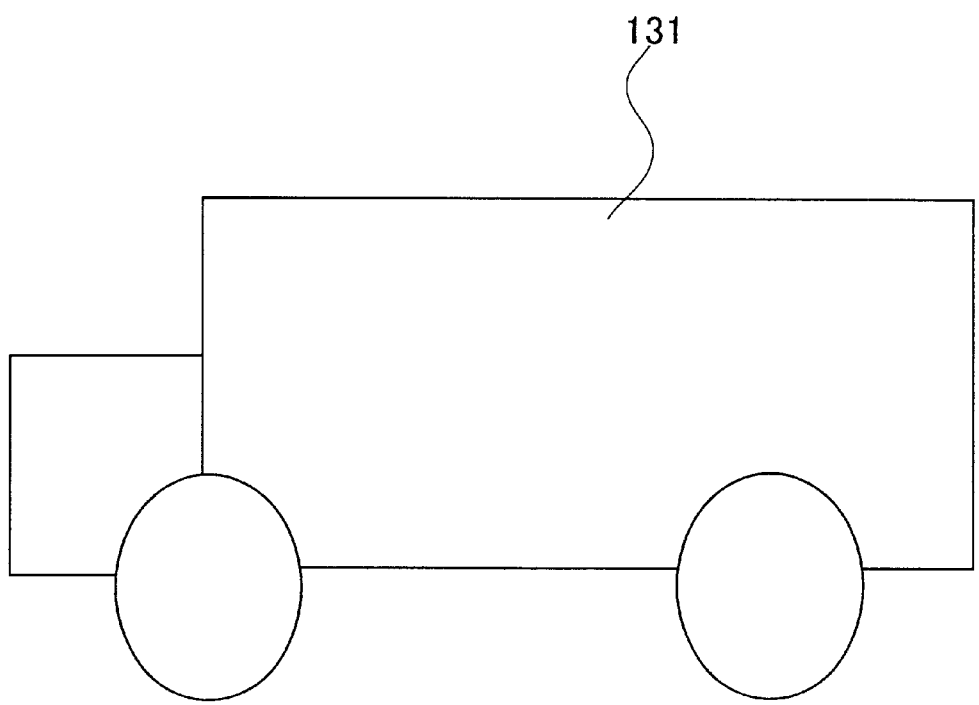
FIG. 15 is a diagram showing a vehicle loaded with a film-repairing apparatus according to Example 11 of the present invention.
Figure 16:
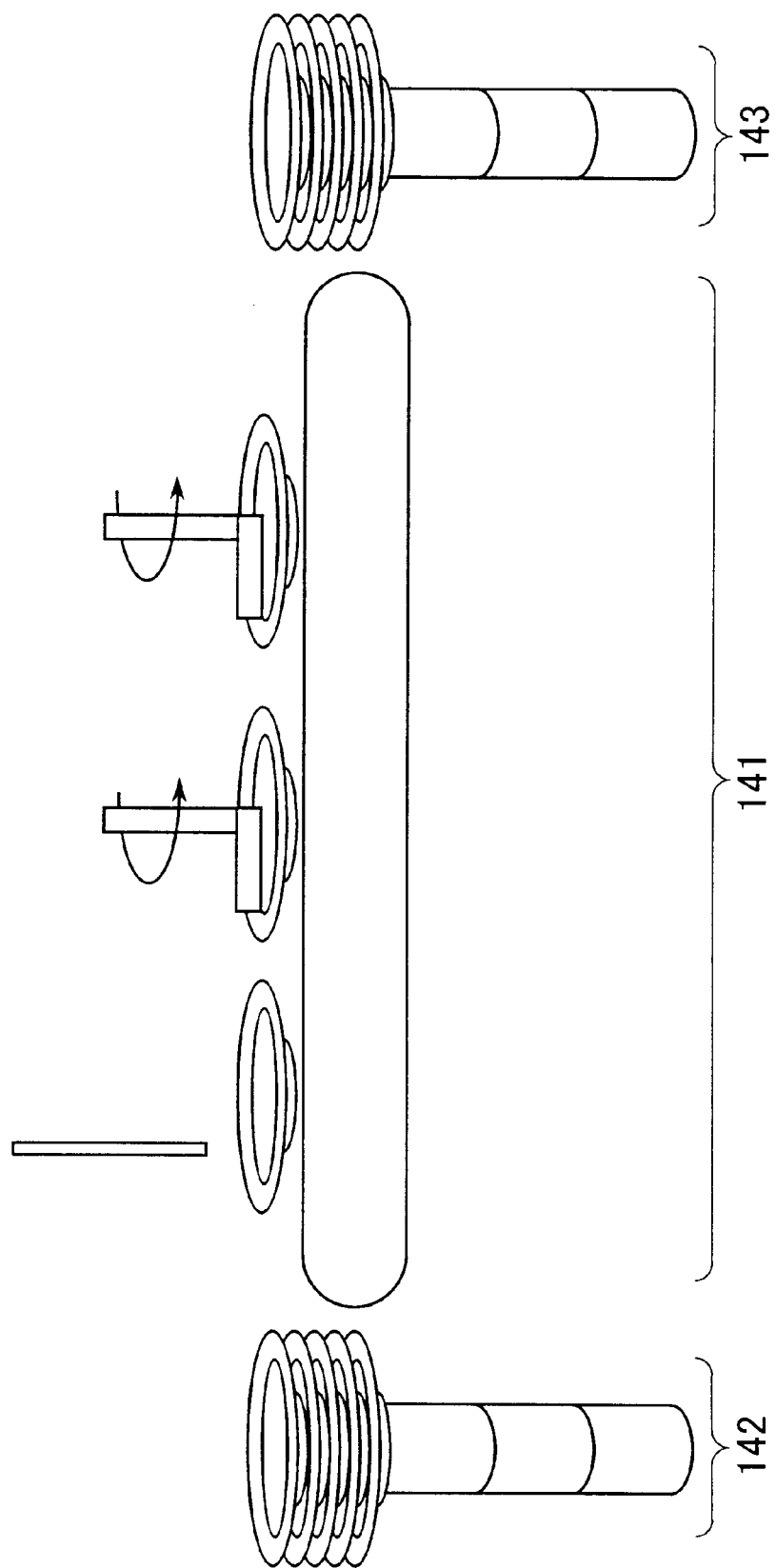
FIG. 16 is a diagram showing the film-repairing apparatus in the vehicle according to Example 11 of the present invention.

FIG. 15 is a scheme of a vehicle 131 loaded with a film-repairing apparatus. FIG. 16 is a representative schematic diagram of the film-repairing apparatus in the vehicle 131. The vehicle loaded with a film-repairing apparatus can repair a film using a chlorosilane-based material, and is in a form of a vehicle, which is movable.

The film-repairing apparatus loaded on the vehicle 131 comprises a temperature and humidity controlling device and a chlorosilane-based material reaction device 141, and further comprises a product-for-repair supplying device 142 and a product-after-repair collecting device 143. The chlorosilane-based material reaction device illustrates the film-forming system shown in FIG. 14 as an example.

Thus, according to the present invention, ceramic and glass products, which need repair of a surface treatment, can be repaired in a short time at a low cost. Therefore, the contribution of the present invention is significant.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing a coating film using a compound (1) represented by a general formula (1) ABXn (where A is a carbon-containing group; B is at least one element selected from Si, Ge, Sn, Ti and Zr; X is a hydrolyzable group; and n is 1, 2 or 3) as a raw material, comprising:

measuring the compound (1) in an amount required for one time application on a surface of a substrate having an active hydrogen on the surface, and supplying it to the surface of the substrate at each time of application;

in an atmosphere having a water vapor concentration of more than 0.0076 kg/M$^3$ and not more than 0.0203 kg/M$^3$, bringing the compound (1) into contact with the surface of the substrate, causing an elimination reaction between the active hydrogen on the surface of the substrate and the hydrolyzable group in parts of the molecules of the compound (1), thereby covalently bonding the parts of the molecules of the compound (1) to the surface of the substrate, as well as polymerizing parts of the molecules of the compound (1) with one another using water molecules present in the atmosphere.

2. The method according to claim 1, wherein at least one solvent not having an active hydrogen is further added to the compound (1).

3. The method according to claim 1, further comprising washing the substrate and the coating film formed on the substrate after the steps shown in claim 1.

4. The method according to claim 1, wherein A in the formula (1) is at least one organic group selected from hydrocarbon groups, fluorocarbon groups, and fluorocarbon-hydrocarbon groups.

5. The method according to claim 1, wherein X in the formula (1) is at least one selected from an isocyanate group, an alkoxyl group, and halogen atoms.

6. The method according to claim 1, wherein the group having an active hydrogen formed on the surface of the substrate is at least one selected from —OH, —NH$_2$, >NH and —COOH groups.

7. The method according to claim 1, wherein the chemical reaction is an isocyanic acid elimination reaction, an alcohol elimination reaction, or a halogenohydrogen elimination reaction.

8. The method according to claim 1, wherein the formed coating film has a thickness of at least 1 nm but not more than 0.5 $\mu$m.

9. The method according to claim 1, wherein the substrate is at least one selected from glass, metals, metal oxides, ceramics, polymer compounds, and composites thereof.

10. The method according to claim 1, wherein the substrate is a product made from an inorganic oxide as a raw material, and is at least one selected from glass products including glass sheets and mirrors, ceramic products, enameled products, and composites thereof.

11. The method according to claim 1, wherein the water vapor concentration is in a range of 0.0077 to 0.0168 kg/m$^3$.

12. The method according to claim 1, wherein the compound (1) is brought into contact with the surface of the substrate by impregnating a porous material with the compound (1) and bringing it into contact with the surface of the substrate, and wherein the porous material is at least one selected from resin foams, woven fabrics, knitted fabrics, nonwoven fabrics, and fiber aggregates.

13. The method according to claim 1, wherein means for bringing the compound (1) into contact with the surface of the substrate is rubbing a body impregnated with the compound (1) on the surface of the substrate, while supplying a solution containing the compound (1) on the surface of the substrate.

14. The method according to claim 1, wherein after bringing the compound (1) into contact with the surface of the substrate, a body impregnated with the compound (1) is rubbed on the surface of the substrate, while blowing a dry warm air to the surface of the substrate.

* * * * *

UNITED STATES PATENT AND TRADEMARK OFFICE
CERTIFICATE OF CORRECTION

PATENT NO. : 6,485,785 B1  Page 1 of 1
DATED : November 26, 2002
INVENTOR(S) : Mino et al.

It is certified that error appears in the above-identified patent and that said Letters Patent is hereby corrected as shown below:

Column 18,
Line 21, "0.0076 kg/M³" should read -- 0.0076 kg/m³ --
Line 22, "kg/M³," should read -- kg/m³, --

Signed and Sealed this

Twenty-fifth Day of November, 2003

JAMES E. ROGAN
*Director of the United States Patent and Trademark Office*